Patented Aug. 23, 1932

1,873,430

UNITED STATES PATENT OFFICE

ANGELO KNORR, OF BERLIN, AND ALBERT WEISSENBORN, OF POTSDAM, GERMANY, ASSIGNORS TO WINTHROP CHEMICAL COMPANY, INC., OF NEW YORK, N. Y., A CORPORATION OF NEW YORK

ALDEHYDES OF THE CYCLOHEXANE SERIES

No Drawing. Application filed June 5, 1930, Serial No. 459,420, and in Germany June 18, 1929.

Our present invention relates to new odoriferous substances and to a process of manufacturing the same.

We have found that 4-cyclohexyl-2-alkyl-butanal of the formula

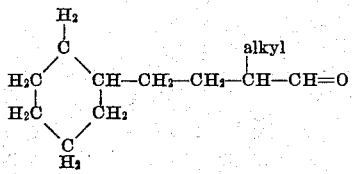

and its nucleal substitution products have a surprisingly novel odor, which is completely different from the ionone odor and has an agreeably bitter character, resembling nuts and leaves. This characteristic odor makes these compounds valuable in producing special flower-like effects in floral oils and for building up quite new fancy perfumes.

The aldehydes in question, hitherto unknown, may be made, for example, by condensing a ketone of fewer carbon atoms with a halogen acetic ester as described in German Patent No. 174279 and splitting up the glycidic acid thus obtained as described in German Patent No. 174239.

The following examples serve to illustrate our invention, the parts being by weight.

*Example 1.*—A mixture of 550 parts of chloroacetic acid ethyl ester and 750 parts of 4(2.2.6-trimethyl-cyclohexyl)-butanone (2) are added drop by drop during several hours while cooling intensively to 100 parts of finely subdivided sodium which is covered by benzene or xylene.

The occurring reaction may be explained by the following equation:

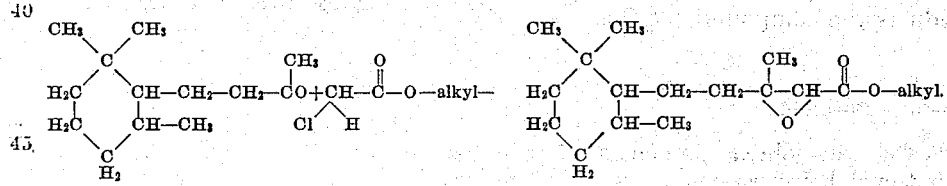

The solvent used and the starting material not consumed are removed from the reaction mixture. The glycidic acid ester obtained boils at a pressure of 4–5 mm. mercury at a temperature of about 170 to 175° C. The ester is saponified by warming it with an aqueous solution of sodium hydroxide. The free glycidic acid is separated from the mixture by addition of mineral acid. By heating the glycidic acid under diminished pressure, carbon dioxide evolves and 460 parts of 4(2.2.6-trimethyl-cyclohexyl)-2-methyl-butanal are obtained.

This compound forms a colorless oil boiling at 115–120° C. at a pressure of 2–3 mm. mercury. It has a nut-like odor.

*Example 2.*—A mixture of 550 parts of chloroacetic acid ethyl ester and 800 parts of 5(2.2.6 - trimethyl - cyclohexyl) - propanone (3) are added drop by drop during several hours while cooling intensively to 100 parts of finely subdivided sodium covered by benzene-oxylene.

The occurring reaction may be explained by the following equation:

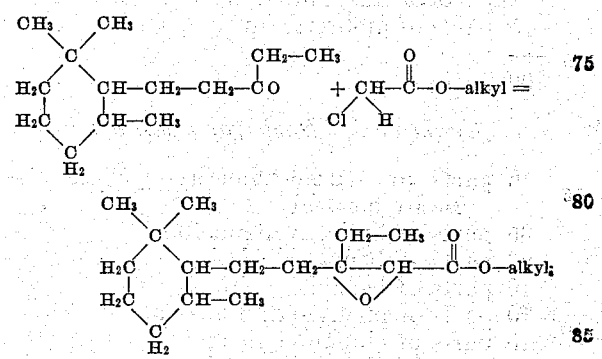

From the reaction mixture after removement of the solvent and of the starting material not consumed, the corresponding glycidic acid ester is obtainable boiling at 178 to 186° C. under a pressure of 5 mm. mercury. The ester is saponified by warming it with an aqueous solution of sodium hydroxide. The glycidic acid is separated from the solution by addition of a mineral acid. The glycidic acid is heated in a vacuum, carbon dioxide evolves and 350 parts of 4(2.2.6-trimethyl-cyclohexyl)-2-ethylbutanal are obtained forming a colorless oil, boiling at 125–130° C. at a pressure of 3–4 mm. mercury.

Our invention is not limited to the foregoing examples or to the specific details given therein.

Other alkyl derivatives of the general formula mentioned above are obtainable in an analogous manner when starting from a corresponding cyclohexyl-butanone. The finely subdivided sodium used in the foregoing examples may be substituted by another alkaline condensing agent such as sodium amide or sodium ethylate.

From our new compounds perfumes may be prepared according to the following examples:

*Example 3. Basis for fancy perfume*

20 parts of 4(2.2.6-trimethyl-cyclohexyl)-2-methyl-butanal
5 parts of ionone
10 parts of methylionone
8 parts of ylang-ylang oil
5 parts of artificial jasmine oil
4 parts of heliotropine
8 parts of cumarin
10 parts of phenyl-ethyl alcohol
15 parts of bergamot oil
5 parts of orange oil
5 parts of East Indian sandal wood oil
5 parts of ambrette musk 100 parts.

*Example 4. Basis for a floral oil*

6 parts of 4(2.2.6-trimethyl-cyclohexyl)-2-ethylbutanal
35 parts of hydroxycitronellal
26 parts of benzyl alcohol
10 parts of benzyl acetate
10 parts of phenyl-ethyl alcohol
10 parts of cinnamic alcohol
3 parts of ylang-ylang oil 100 parts.

What we claim is:—

1. As new products the compounds of the general formula

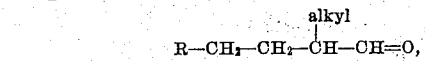

wherein R stands for a cyclohexane nucleus or 1.1.3-methylated cyclohexyl radical, these compounds being at room temperature in the pure state colorless oils of an agreeable bitter odor resembling nuts and leaves.

2. As new products the compounds of the general formula

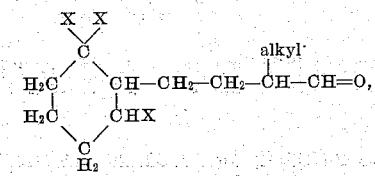

wherein X stands for hydrogen or methyl, these compounds being at room temperature in the pure state colorless oils of an agreeable bitter odor resembling nuts and leaves.

3. As new products the compounds of the general formula

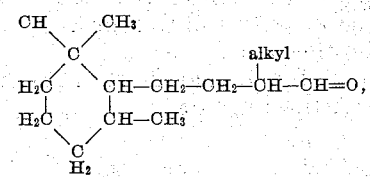

these compounds being at room temperature in the pure state colorless oils of a nut-like odor.

4. As a new product 4(2.2.6-trimethyl-cyclohexyl)-2-methyl-butanal corresponding to the formula

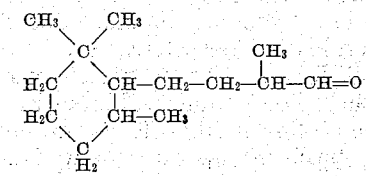

being a colorless oil boiling at 115–120° C. at a pressure of 2–3 mm. mercury and having a nut-like odor.

5. As a new product, 4-(2.2.6-trimethyl-cyclohexyl)-2-ethyl-butanal corresponding to the formula:

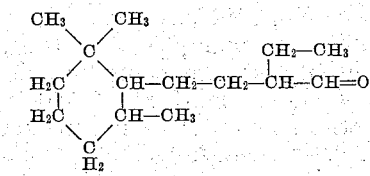

being a colorless oil, boiling at 125 to 130° C. at a pressure of 3 to 4 mm. mercury.

In testimony whereof, we affix our signatures.

DR. ANGELO KNORR.
DR. ALBERT WEISSENBORN.